United States Patent [19]

Beus et al.

[11] Patent Number: 5,728,953
[45] Date of Patent: Mar. 17, 1998

[54] CABLE LOAD SENSING DEVICE

[75] Inventors: Michael J. Beus; William G. McCoy, both of Spokane, Wash.

[73] Assignee: United States Department of Energy, Washington, D.C.

[21] Appl. No.: 726,226

[22] Filed: Oct. 4, 1996

[51] Int. Cl.$^6$ ...................................................... G01L 1/04
[52] U.S. Cl. ................. 73/862.472; 73/862.474; 73/862.392
[58] Field of Search .................... 73/827, 828, 831, 73/833, 862.392, 862.391, 862.451, 862.46, 862.471, 862.472, 862.474

[56] References Cited

U.S. PATENT DOCUMENTS

| | | | |
|---|---|---|---|
| 1,768,991 | 7/1930 | Lucas | 73/471 |
| 2,362,626 | 11/1944 | Giffen | 73/862.392 |
| 3,124,770 | 3/1964 | Cieavatta et al. | |
| 3,238,731 | 3/1966 | Seifert et al. | |
| 3,284,749 | 11/1966 | Fouretier et al. | |
| 3,541,844 | 11/1970 | Stover et al. | |
| 3,621,927 | 11/1971 | Ormond et al. | |
| 4,019,365 | 4/1977 | Woo | 73/828 |
| 4,803,888 | 2/1989 | Choquet | 73/862.392 |
| 4,989,450 | 2/1991 | Shoberg et al. | 73/862.471 |

OTHER PUBLICATIONS

Michael J. Beus and William G. McCoy, Mine Shaft Conveyance Load–Monitoring System, 5 pages, The paper was presented on Oct. 11, 1995.

*Primary Examiner*—Elizabeth L. Dougherty
*Assistant Examiner*—Max H. Noori
*Attorney, Agent, or Firm*—Mark LaMarre; Mark P. Dvorscak; William R. Moser

[57] ABSTRACT

Apparatus for sensing the magnitude of a load on a cable as the cable is employed to support the load includes a beam structure clamped to the cable so that a length of the cable lies along the beam structure. A spacer associated with the beam structure forces a slight curvature in a portion of the length of cable under a cable "no-load" condition so that the portion of the length of cable is spaced from the beam structure to define a cable curved portion. A strain gauge circuit including strain gauges is secured to the beam structure by welding. As the cable is employed to support a load the load causes the cable curved portion to exert a force normal to the cable through the spacer and on the beam structure to deform the beam structure as the cable curved portion attempts to straighten under the load. As this deformation takes place, the resistance of the strain gauges is set to a value proportional to the magnitude of the normal strain on the beam structure during such deformation. The magnitude of the normal strain is manipulated in a control device to generate a value equal to the magnitude or weight of the load supported by the cable.

10 Claims, 1 Drawing Sheet

CABLE LOAD SENSING DEVICE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention relates generally to apparatus for sensing the weight of a mechanical load and, more particularly, to apparatus for sensing the magnitude of a mechanical load on a cable as the cable is employed to support the load.

2. Description of the Prior Art

The ability to accurately monitor or sense the magnitude of a load supported by a wire rope cable is of great value in all manner of "cable-type" systems, including elevator hoist and shaft conveyance systems, cable tension monitoring systems, and other cable hoisting applications such as employed with mobile and runway-based cranes and in underground mine hoisting operations. Obviously, the ability to accurately monitor the magnitude of cable loading is a key element for enhancing hoisting safety since the ability to monitor the magnitude of cable loading will permit system operating and maintenance personnel to detect slack or overloaded cable conditions that might be harmful to both equipment and such personnel.

Previous approaches to monitoring the magnitude of a load supported by a wire rope cable have favored: (i) in-line load cells in the cable load path located at the load termination; (ii) compressive load cells located at the sheave wheel pillow blocks at the headframe which supports the load-supporting cable; or (iii) load cells or strain gauges mounted on the load itself. These approaches utilize a broad range of commercially available load transducers with many of the principles and concepts of operation covered by various patents including, but not limited to, the following patents: U.S. Pat. No. 3,104,645 to Harrison; U.S. Pat. No. 3,124,770 to Ciavatta; U.S. Pat. No. 3,238,731 to Seifert et al; U.S. Pat. No. 3,284,749 to Fouretier; U.S. Pat. No. 3,541,844 to Stover; and U.S. Pat. No. 3,621,927 to Ormond. The approaches disclosed in each of these patents have several disadvantages. For example, in-line load cells may compromise the safety and integrity of the wire rope cable and are costly and difficult to install because they require a significant modification to the load termination point. Pillow-block load cells located at the head sheave pulley determine total load, including the load contribution of the cable itself. This makes the determination of the net weight of the load, and therefore overload conditions, difficult to determine, particularly for long cable lengths where the weight of the cable becomes a significant part of the total load. In addition, pillow-block load cells are subject to significant errors because of shearing loads and cable oscillations due to variations in the fleet angle as the cable is wound on the drum and misaligned guide-rails in the hoistway. Both the in-line load cells and the pillow-block cells require the use of high capacity load cells to accommodate the required safety factors of the structures in which they are installed (i.e. the cable and head pulley respectively). This reduces load sensitivity so that small but significant changes in load and cable tension cannot be determined. Strain gauges mounted on a load bearing member of a load to be hoisted, such as the crosshead of an elevator car, are subject to a wide range of strain conditions which are very difficult to interpret in terms of actual load on the car itself. For example, the strain distribution in the crosshead could be a combination of tension, compressive, and bending strains being exerted on the crosshead, depending on the loading pattern in the hoist or elevator car, and variation in the wire rope tension in multiple hoist cable installations in elevators.

From the foregoing, it is apparent that presently available devices utilized to monitor or sense the magnitude of a load supported by a wire rope cable are not without their shortcomings. Therefore, there is a need for an improved cable load sensing device to monitor the magnitude of a load supported by a cable which overcomes these shortcomings.

SUMMARY OF THE INVENTION

The present invention is directed to a cable load sensing device designed to satisfy the aforementioned need. The cable load sensing device of the present invention incorporates a novel design in that, when attached to a cable to be monitored under a cable "no-load" condition, it causes the cable to slightly flex in the area of the device. As the cable experiences a load, the cable attempts to straighten itself out due to the sheer weight of the load. As the cable straightens, it bends or "flexes" the device and the amount of flexure is proportional to the magnitude of the load being supported by the cable. The operating principle of the present invention is based on the theory of elasticity for a distributed line load across and normal to the transverse center of a beam simply supported at each end. This novel design feature allows load weight to be determined independently of the cable load path and thus is not subject to overload or failure.

Accordingly, the present invention is directed to an apparatus for sensing the magnitude of a load on a cable as the cable is employed to support the load. The apparatus includes: (a) a beam structure; (b) means for clamping the beam structure to a cable so that a length of the cable lies along the beam structure; (c) spacer means associated with the beam structure for forcing a slight curvature in a portion of the length of the cable under a cable no-load condition so that the portion of the length of cable is spaced from the beam structure to define a cable curved portion; and (d) sensing means secured to the beam structure. When clamped to a cable employed to support a load, the load causes the cable curved portion to exert a force normal to the cable through the spacer means and on the beam structure to deform the beam structure as the cable curved portion attempts to straighten under the load. As this occurs, the sensing means detects the magnitude of the strain on the beam structure during such deformation of the beam structure, and the magnitude of the strain is proportional to the magnitude of the load on the cable.

These and other features and advantages of the present invention will become apparent to those skilled in the art upon a reading of the following detailed description when taken in conjunction with the drawings wherein there is shown and described an illustrative embodiment of the present invention.

BRIEF DESCRIPTION OF THE DRAWINGS

In the course of the following detailed description, reference will be made to the attached drawings in which.

DETAILED DESCRIPTION OF THE INVENTION

Figure 1:
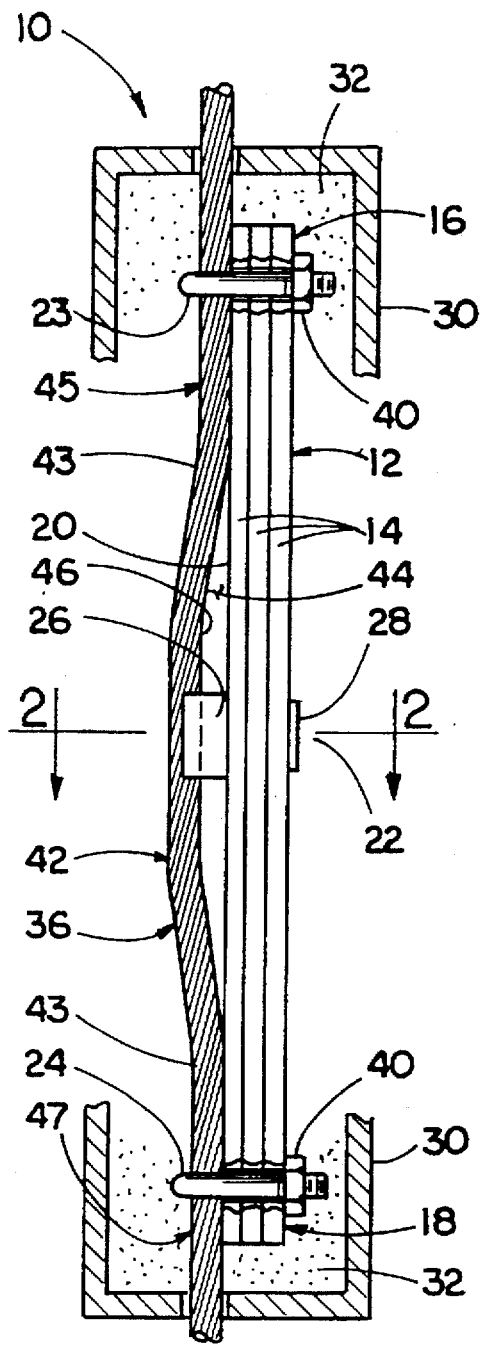
FIG. 1 is a side elevational view, partially in section, of the cable load sensing device of the present invention clamped to a cable and operable to sense the magnitude of a load on the cable as the cable is employed to support the load.
Figure 2:
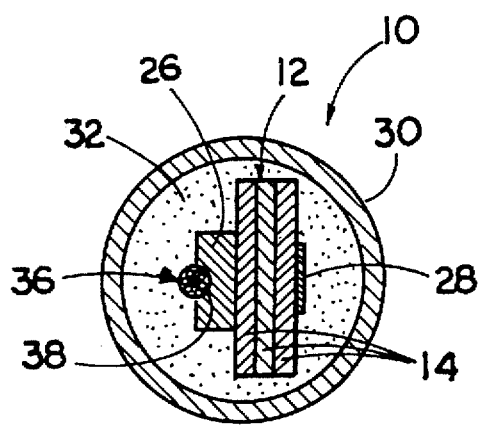
FIG. 2 is a cross-sectional view of the cable load sensing device of the present invention taken along line 2—2 of FIG. 1.

Referring now to the drawings, and particularly to FIGS. 1 and 2, there are illustrated respective side elevational and cross-sectional views of the cable load sensing device of the present invention, being generally designated by the numeral 10. As will be described herein, the cable load sensing device 10 employs a novel design in that it is attached to "in parallel" to a cable to be monitored rather than placed in series with the cable as is done with in-line load cells or placed in a position to indirectly measure the weight of the load supported by the cable such as is done when load cells are placed in the pillow block area of the sheave wheel(s) used to support the cable. With the arrangement to be described herein, the load sensing device 10 is attached to a section of a cable to be monitored, and the act of attachment causes the cable to flex or bend at the attachment area. As the cable experiences a load, the cable attempts to straighten itself out due to the weight of the load. As the cable straightens, it deforms or "flexes" the load sensing device 10. The amount of deformation, which is measured by an electronic sensor on the load sensing device 10, is proportional to the magnitude or weight of the load supported by the cable. The novel design of the load sensing device 10 allows the weight of the load to be determined independently of the cable load path since the device measures bending strains resulting from the normal load component of the cable tension developed when the cable supports the load. The design principle is based on the theory of elasticity for a distributed line load across and normal to the transverse center of a beam simply supported at each end. With this arrangement, the tensile force components in the cable generated by the load supported by the cable are not applied to the load sensing device 10 and, therefore, the load sensing device 10 is not in the load path of the cable and subject to overload. As will be appreciated, the load sensing device 10 of the present invention has applications in all manner of hoisting applications, including mining, construction and industrial applications.

Construction of the Invention

As seen in FIGS. 1 and 2, the cable load sensing device 10 includes a beam structure 12 preferably formed from three metal flat bars 14 in a laminar arrangement although one or two bars would be sufficient. Preferably, the metal bars 14 are formed from titanium alloy 6A14V in order to provide the beam structure 12 with the required sensitivity to the small normal forces. In addition, this alloy has been found to exhibit virtually no hysteresis or fatigue from long term loading and repeated loading/unloading cycles that would normally be experienced by a cable employed in hoisting operations. In addition, the titanium alloy is totally immune to corrosive atmospheres and other harsh conditions that may be experienced in hoisting applications in outdoor or underground environments.

The beam structure 12 includes a first end portion 16, a second end portion 18 and a substantially flat first surface portion 20. As seen particularly in FIG. 2, the metal bars 14 forming the beam structure 12 are drilled at each of the respective first and second end portions 16, 18 to accommodate two generally "U"-shaped clamps 23 and 24 that extend completely through the metal bars 14 at the first and second end portions 16, 18 of the beam structure 12. The "U"-shaped clamps 23 and 24 may be Crosby clips which are commonly used for wire rope cable terminations. A spacer block 26 is positioned at the midpoint and suitably fastened on the first surface 20 of the beam structure 12. An electronic sensing device in the form of a strain gauge circuit 28, itself well known in the art, is attached to the beam structure 12 at the midpoint 22 by suitable means, such as by welding. The beam structure 12 and associated components, such as clamps 23 and 24, the spacer block 26 and the strain gauge circuit 28, are all positioned within a protective housing 30 as shown in FIG. 1, a portion of which being removed for clarity. The housing 30 is preferably made from a stainless steel or aluminum material and is filled with a low viscosity, flexible, epoxy material such as a polyfoam insulating material 32. This encapsulation provides the cable load sensing device 10 with electrical insulation, high impact and mechanical shock resistance, and minimal sensitivity to thermal extremes. With this arrangement, the cable load sensing device 10 is capable of withstanding the rigors of rugged, long-term, unattended operation such as may be experienced in some industrial and underground mining operations, and also to survive hazardous conditions. This includes limited access and cramped space, hot, humid and corrosive atmospheres, water and falling rock and debris, and shock loads from blasting.

Cable Load Sensing Device Operation

Figure 3:
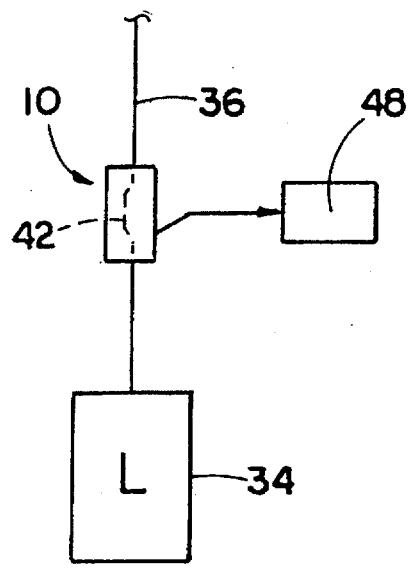
FIG. 3 is a block diagram illustration of the cable load sensing device of the present invention utilized to determine the weight of the load attached to the cable.

As seen with respect to FIGS. 1, 2 and 3, the cable load sensing device 10 of the present invention is operable to detect the magnitude or weight of a load, such as the load illustrated graphically in FIG. 3 by the numeral 34, which is placed on a cable, such as the cable 36, as the cable 36 is employed to support the load 34. In order to employ the cable load sensing device 10, each of the clamps 23 and 24 is first removed from the beam structure 12. The cable 36 is then brought into contact with the elevated curved surface 38 of the spacer block 26 positioned at the midpoint 22 of the beam structure 12. With the cable 36 in the position as described, the clamps 23 and 24 are inserted as shown in FIG. 1 and tightened in place via the nuts 40. Only the nuts 40 on one of the clamps 23 or 24 is tightened sufficiently to secure the beam structure 12 to the cable 36, the other nuts 40 of the corresponding clamp 23 or 24 are just loosely tightened such that the cable 36 slips under the clamp as it is tensioned. The cable 36 resting on the curved surface 38 of the spacer block 26 flexes the cable into a slight curvature 43 of preferably less than one degree in both ends 45, 47 of the portion 42 of the cable 36 located between the clamps 23 and 24. This curvature 43 creates a gap 44 of approximately slightly less that one sixteenth (1/16) of an inch between the outer surface 46 of the cable 36 and the first surface 20 of the beam structure 12.

With the beam structure 12 of the cable load sensing device 10 positioned as described, the cable 36 is tensioned as it is employed to support the load 34. As the cable 36 is tensioned, the weight of the load 34 acts on the portion 42 of the cable 36 positioned between the clamps 23 and 24 to cause the portion 42 of the cable 36 to attempt to straighten itself and thus remove the curvatures 43 at each of the ends 45, 47 of the cable 36 located between the U-clamps 23 and 24. This action takes place because one of the clamps 23 or 24 is securely tightened on the cable 36 whereas the other clamp is loosely secured to allow for slippage. Since the curvature 43 at each end of the cable 36 is substantially eliminated the cable 36 experiences no stress concentrations at the clamps 23, 24.

Tensioning the cable 36 generates normal force components at the area of the spacer block 26 as the curvatures 43 are removed, and as these normal force components of the tension on the cable 36 acting on the spacer block 26 are transferred to the beam structure 12 and result in a bending or deformation strain at the midpoint 22 of the beam structure 12. This bending strain also acts on the strain gauge circuit 28 to cause deformation of the strain gauge or guages of the strain guage circuit 28. As the strain gauge of the strain gauge circuit 28 is deformed, the amount of deformation sets the resistance value of the strain gauge 28 to a value which is proportional to the magnitude of the normal component of the strain on the beam structure 12 as the beam structure 12 is subject to such normal forces. The resistance value of the strain gauge circuit 28 is utilized by a control device 48 connected with the strain gauge circuit 28 to generate a millivolt signal in a well-known manner, and the millivolt signal is proportional to the value of the resistance and representative of the magnitude or weight of the load supported by the cable 36.

It is thought that the present invention and many of its attendant advantages will be understood from the foregoing description and it will be apparent that various changes may be made in the form, construction and arrangement of the parts of the invention described herein without departing from the spirit and scope of the invention or sacrificing all of its material advantages, the form hereinbefore described being merely a preferred or exemplary embodiment thereof.

We claim:

1. Load sensor apparatus for sensing the magnitude of a load on a cable as the cable is employed to support the load, comprising;
   (a) a non-load bearing beam structure, wherein the beam structure does not bear a load in the axial direction of the cable;
   (b) means for slidably attaching said beam structure to said cable so that a length of cable lies along said beam structure;
   (c) spacer means associated with said beam structure for forcing a slight curvature in a portion of said length of cable under a no-load condition so that said portion of said length of cable is spaced from said beam structure to define a cable curved portion; and
   (d) sensing means secured to said beam structure; whereby as said cable is employed to support a load the load causes said cable curved portion to exert a force normal to said cable through said spacer means and on said beam structure to deform said beam structure as said cable curved portion attempts to straighten under the load and said sensing means detects the magnitude of the normal strain on said beam structure during said deformation which is proportional to the magnitude of the load on said cable.

2. The load sensor apparatus as recited in claim 1, wherein said beam structure is an elongated structure having a substantially flat first surface portion, first and second end portions and means at said first and second end portions for clamping said beam structure to said cable so that said length of cable lies along said first surface portion.

3. The load sensor apparatus as recited in claim 2, wherein said means at each of said first and second end portions for clamping said beam structure to said cable is a generally "U"-shaped clamp.

4. The load sensor apparatus as recited in claim 2, wherein said beam structure is made from a titanium alloy material.

5. The load sensor apparatus as recited in claim 4, wherein said beam structure is made from titanium alloy 6A14V.

6. The load sensor apparatus as recited in claim 4, wherein said beam structure is a laminated assembly formed from flat bars of titanium alloy.

7. The load sensor apparatus as recited in claim 2, wherein said spacer means is positioned on said first surface portion of said beam structure midway between said first and second end portions thereof and forces a curvature of less than one degree in said portion of said length of cable upon clamping said beam structure to said cable.

8. The load sensor apparatus as recited in claim 1, wherein:
   said sensing means includes at least one strain gauge that provides a resistance value which is proportional to the magnitude of the normal strain on said beam structure during deformation; and
   said resistance value is a component of a control device which generates a millivolt signal proportional to said resistance value and representative of the magnitude of said load supported by said cable.

9. The load sensor apparatus as recited in claim 1, wherein said beam structure, sensing means and said length of cable are all disposed within a protective housing made from a metal material and filled with a polyfoam insulation.

10. The load sensor apparatus as recited in claim 1, wherein said beam structure is elongated and said spacer means is located on and midway between the opposite ends of said elongated beam structure.

* * * * *